US00RE47784E

(19) United States
(12) Reissued Patent
Kammer

(10) Patent Number: US RE47,784 E
(45) Date of Reissued Patent: Dec. 31, 2019

(54) ELECTRIC HAIR GROOMING APPLIANCE INCLUDING TOUCHSCREEN

(71) Applicant: Spectrum Brands, Inc., Middleton, WI (US)

(72) Inventor: Carl Gottfried Kammer, Middleton, WI (US)

(73) Assignee: Spectrum Brands, Inc., Middleton, WI (US)

(21) Appl. No.: 15/416,881

(22) Filed: Jan. 26, 2017

Related U.S. Patent Documents

Reissue of:
(64) Patent No.: 8,938,884
Issued: Jan. 27, 2015
Appl. No.: 13/051,069
Filed: Mar. 18, 2011

(51) Int. Cl.
*B26B 19/38* (2006.01)
*B26B 19/20* (2006.01)

(52) U.S. Cl.
CPC ..... *B26B 19/388* (2013.01); *B26B 19/20* (2013.01); *B26B 19/3853* (2013.01); *B26B 19/3886* (2013.01)

(58) Field of Classification Search
CPC ..... B26B 19/388; B26B 19/3853; B26B 19/3886; B26B 19/20
USPC ..... 30/201, 233.5, 34.05
See application file for complete search history.

(56) References Cited

U.S. PATENT DOCUMENTS 1,988,199 A 1/1935 Greco et al. ..... B26B 19/20 30/202
2,103,418 A * 12/1937 Hagebeuker ..... B26B 19/20 30/202
2,214,069 A 9/1940 Sikora ..... B26B 19/20 30/201
2,593,168 A 4/1952 Monyhan ..... B26B 19/20 30/201
2,809,425 A 10/1957 Tettis ..... B26B 19/20 30/233.5
3,149,418 A 9/1964 Milbourne ..... B26B 19/20 30/201

(Continued)

FOREIGN PATENT DOCUMENTS

CN 201056003 * 5/2008
CN 201056003 Y 5/2008

(Continued)

OTHER PUBLICATIONS

Partial European Search Report Application No. 12160136.-2313; dated Jun. 25, 2012; 8 pages.*

(Continued)

*Primary Examiner* — William C Doerrler
(74) *Attorney, Agent, or Firm* — Armstrong Teasdale LLP

(57) ABSTRACT

An electric hair grooming appliance is configured to have one or more operations to facilitate grooming of hair. The electric hair grooming appliance includes a control circuit, and a touchscreen for receiving one or more inputs from a user and to facilitate communication between the user and the control circuit. The touchscreen is configured to send one or more command signals to the control circuit in response to receiving the one or more inputs from the user. The control circuit is configured to control one or more operations of the electric hair grooming appliance in response to receiving one or more of the command signals.

19 Claims, 10 Drawing Sheets

(56) References Cited

U.S. PATENT DOCUMENTS 3,264,735 A 8/1966 Du Charme ..... B26B 19/20 30/201
3,287,805 A 11/1966 Du Charme ..... B26B 19/20 30/202
3,387,367 A 6/1968 Merzon ..... B26B 19/20 30/201
3,918,154 A 11/1975 Pagani ..... B26B 21/00 30/34.2
4,085,503 A 4/1978 Beck et al. ..... B26B 19/06 30/201
5,259,115 A 11/1993 Bluder et al.
5,498,914 A 3/1996 De Boer ..... H03K 17/955 307/116
5,659,957 A 8/1997 Fujita ..... B26B 19/20 30/124
5,898,999 A 5/1999 Chaouachi et al. .... B26B 19/20 30/200
5,979,060 A 11/1999 Holzbauer et al. ..... B26B 19/20 30/200
6,079,103 A 6/2000 Melton et al.
6,279,234 B1 8/2001 Chaouachi et al. .... B26B 19/20 30/200
6,393,718 B1 5/2002 Harris et al. ..... A45D 20/12 34/96
6,708,408 B2 3/2004 Orloff ..... B26B 21/4056 30/34.05
6,824,542 B2 11/2004 Jay
6,928,235 B2 8/2005 Pollack ..... A47K 10/48 34/90
6,968,623 B2 * 11/2005 Braun ..... B26B 19/20 30/201
D517,242 S 3/2006 Goetschi et al. ..... D28/53
7,248,892 B2 7/2007 White et al. ..... B23Q 1/0009 455/550.1
7,313,422 B2 12/2007 White et al. ..... B23Q 1/0009 455/557
7,373,170 B2 5/2008 White et al. ..... B23Q 1/0009 235/375
7,376,439 B2 5/2008 White et al. ..... B23Q 1/0009 235/375
7,392,059 B2 6/2008 White et al. ..... B23Q 1/0009 235/375
7,411,511 B2 8/2008 Kennish et al. ... G09B 19/0076 340/3.1
7,466,040 B2 12/2008 Bruwer ..... H05B 37/0227 307/116
7,509,743 B2 3/2009 Oh ..... B26B 19/20 30/200
7,698,822 B2 4/2010 Kostner et al.
7,699,058 B1 4/2010 Jay ..... A61N 5/0617 128/898
7,755,219 B2 7/2010 Bruwer ..... H05B 37/0227 307/116
7,791,490 B2 9/2010 Kennish et al. ... G09B 19/0076 340/3.1
7,830,160 B2 11/2010 Philipp ..... G06F 3/044 324/686
7,915,765 B2 3/2011 Bruwer ..... H05B 37/0227 307/116
7,916,834 B2 3/2011 Piorek et al. ..... G01N 23/223 378/102
7,975,387 B2 * 7/2011 Mikula ..... B26B 19/20 30/201
7,992,307 B2 8/2011 Smal ..... B26B 19/20 30/202
7,999,686 B2 8/2011 Kennish et al. ... G09B 19/0076 340/3.1
8,028,708 B2 10/2011 Molema et al. ..... B26B 19/40 132/292
8,341,846 B1 * 1/2013 Holmes ..... B26B 19/205 30/200
2003/0204956 A1 11/2003 Chan ..... B26B 19/20 30/233.5
2004/0167481 A1 8/2004 Carlucci et al.
2004/0237308 A1 12/2004 Mitchell et al. ..... B26B 19/14 30/43.6
2005/0011533 A1 1/2005 Ruben ..... A45D 1/28 132/230
2005/0076931 A1 4/2005 Leung et al. ..... A45D 2/00 132/200
2005/0098192 A1 5/2005 Cafaro ..... A45D 1/06 132/232
2005/0246902 A1 * 11/2005 Poran ..... B26B 19/20 30/201
2006/0030908 A1 2/2006 Powell et al.
2006/0107529 A1 * 5/2006 Kostner et al. ..... B26B 19/063 30/43
2006/0123633 A1 * 6/2006 Hauer ..... B26B 19/20 30/201
2006/0196057 A1 * 9/2006 So ..... A47J 43/283 30/322
2006/0283022 A1 12/2006 Oh ..... B26B 19/20 30/216
2007/0028942 A1 2/2007 Leung ..... A45D 2/00 132/333
2007/0213742 A1 9/2007 Callahan ..... A61B 17/00 606/133
2008/0072896 A1 3/2008 Selzer et al.
2008/0109973 A1 5/2008 Farrell et al. ..... A46B 7/04 15/4
2008/0163495 A1 7/2008 Smal ..... B26B 19/20 30/202
2008/0189951 A1 * 8/2008 Molema et al. ..... B26B 19/40 30/41
2008/0220752 A1 * 9/2008 Forstall et al. ..... H04M 1/56 455/415
2008/0275533 A1 11/2008 Powell
2009/0002942 A1 1/2009 Seifert et al.
2009/0038639 A1 2/2009 Yetukuri et al. ... A46B 15/0002 134/6
2009/0084396 A1 4/2009 Jerome et al. ..... A45D 1/04 132/224
2009/0143914 A1 6/2009 Cook et al. ..... A46B 15/0002 700/275
2009/0187676 A1 * 7/2009 Griffin et al. ..... H04M 1/67 710/14
2009/0319710 A1 12/2009 Liu
2010/0083508 A1 4/2010 Cheng ..... B26B 19/20 30/201
2010/0186234 A1 7/2010 Binder ..... A45D 26/00 30/34.05
2010/0281636 A1 11/2010 Ortins et al. ..... A46B 9/04 15/4
2011/0107604 A1 5/2011 Julemont ..... B26B 19/20 30/201
2011/0120491 A1 5/2011 You ..... A45D 2/001 132/223
2011/0139167 A1 6/2011 Li et al. ..... A45D 29/00 132/73
2011/0142200 A1 6/2011 Piorek et al. ..... G01N 23/223 378/45
2011/0302519 A1 12/2011 Fleizach et al.

FOREIGN PATENT DOCUMENTS

CN 201161430 * 12/2008
CN 201161430 Y 12/2008
DE 3800966 * 7/1989
DE 3800966 A1 7/1989
EP 0484795 * 5/1992
EP 0484795 A1 5/1992
EP 0928670 * 7/1999
EP 0928670 A1 * 7/1999
EP 1510305 * 3/2005
EP 1510305 A1 3/2005
EP 1612007 * 1/2006
EP 1612007 A1 1/2006

(56) References Cited

FOREIGN PATENT DOCUMENTS

| | | | | |
|---|---|---|---|---|
| EP | 1710055 | | * | 10/2006 |
| EP | 1710055 | A1 | | 10/2006 |
| EP | 1834540 | A1 | | 9/2007 |
| EP | 1880811 | | * | 1/2008 |
| EP | 1880811 | A1 | | 1/2008 |
| EP | 2108489 | | * | 10/2009 |
| EP | 2108489 | A1 | | 10/2009 |
| GB | 2267151 | | * | 11/1993 |
| GB | 2267151 | A | | 11/1993 |
| JP | 2000505685 | | * | 5/2000 |
| JP | 2000505685 | A | | 5/2000 |
| JP | 2001334077 | | * | 12/2001 |
| JP | 2001334077 | A | | 12/2001 |
| JP | 2008544823 | | * | 12/2008 |
| JP | 2008544823 | A | | 12/2008 |
| WO | 9825735 | A1 | | 6/1998 |
| WO | WO9825735 | | * | 6/1998 |
| WO | 2006100627 | A1 | | 9/2006 |
| WO | WO2006100627 | | * | 9/2006 |
| WO | 2007006106 | A1 | | 1/2007 |
| WO | WO2007006106 | | * | 1/2007 |
| WO | 2009124822 | A1 | | 10/2009 |
| WO | WO2009124822 | | * | 10/2009 |
| WO | 2010091882 | A1 | | 8/2010 |
| WO | WO2010091882 | | * | 8/2010 |
| WO | 2011098159 | A1 | | 8/2011 |
| WO | WO2011098159 | | * | 10/2011 |

OTHER PUBLICATIONS

"Touchscreens 101: Understanding Touchscreen Technology and Design" Kolokowsky, Steve, Cypress Semiconductor Corp, Jun. 2009.

"Taking Touch to New Frontiers: Why It Makes Sense and How to Make It Happen" Hamblin, Mark, Information Display, Society for Information Display, 2010.

"The State of the Touch-Screen Market in 2010" Colegrove, Jennifer, Information Display, Society for Information Display, 2010.

Partial European Search Report Application No. 12160136.-2313; Jun. 25, 2012; 8 pages.

Extended European Search Report dated Oct. 12, 2012 for Application No. 12160136.3-2313/2500153; 10 pages.

Partial European Search Report App. No. 14175580.1-1656 dated Sep. 10, 2014, 8 pages.

* cited by examiner

NEW

ELECTRIC HAIR GROOMING APPLIANCE INCLUDING TOUCHSCREEN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE DISCLOSURE

The present disclosure relates generally to an electric hair grooming appliance, and more particularly to an electric hair grooming appliance including a touchscreen.

BACKGROUND OF THE DISCLOSURE

Many different types of electric hair grooming appliances are available for use in grooming hair. For example, such electric hair grooming appliances include curling irons, flat irons (which are also sometimes referred to as heated tongs or hair straighteners), blow dryers, hair setters (also known as hot rollers or curlers), and electric hair removers, such as foil shavers, rotary shavers, trimmers, clippers, and epilators.

Most electric hair grooming appliances include mechanical controls, such as buttons and knobs, to allow a user to control certain operations of the electric grooming appliance. These mechanical controls may be difficult to use for some users, particularly for users suffering from arthritis and other physical ailments of their hands. Moreover, the bulkiness of the mechanical controls limits the functions and operations of the hair grooming appliances that can be controlled by the user.

SUMMARY

In one aspect, an electric, handheld hair grooming appliance generally comprises a housing, and at least one hair grooming device carried by the housing and adapted to facilitate grooming of hair. The at least one hair grooming device is adapted to perform an operation using electrical energy applied thereto. A control circuit is in the housing and in communication with the at least one hair grooming device. A touchscreen is on at least one of the at least one hair grooming device and the housing for receiving at least one input from a user and to facilitate communication between the user and the control circuit. The touchscreen is configured to send at least one command signal to the control circuit in response to receiving said at least one input from the user. The control circuit is configured to control the operation of the at least one hair grooming device in response to receiving the at least one command signal.

In another aspect, a method of controlling an operation of an electric hair grooming appliance generally comprises receiving an input using a touchscreen of the electric hair grooming appliance. The input corresponds to a desired setting of at least one operating parameter of the appliance. A command signal is sent from the touchscreen to a control circuit of the electric hair grooming appliance in response to receiving the input. The operation of the electric hair grooming appliance is controlled using the control circuit in response to receiving the command signal.

In yet another aspect, an electric hair grooming appliance is configured to have an operation to facilitate grooming of hair. The electric hair grooming appliance generally comprises a control circuit, and a touchscreen for receiving at least one input from a user and to facilitate communication between the user and the control circuit. The touchscreen is configured to send at least one command signal to the control circuit in response to receiving the at least one input from the user. The control circuit is adapted to control the operation of the electric hair grooming appliance in response to receiving the at least one command signal.

BRIEF DESCRIPTION OF THE DRAWINGS

Corresponding reference characters indicate corresponding parts throughout the drawings.

DETAILED DESCRIPTION OF THE DRAWINGS

Figure 1:
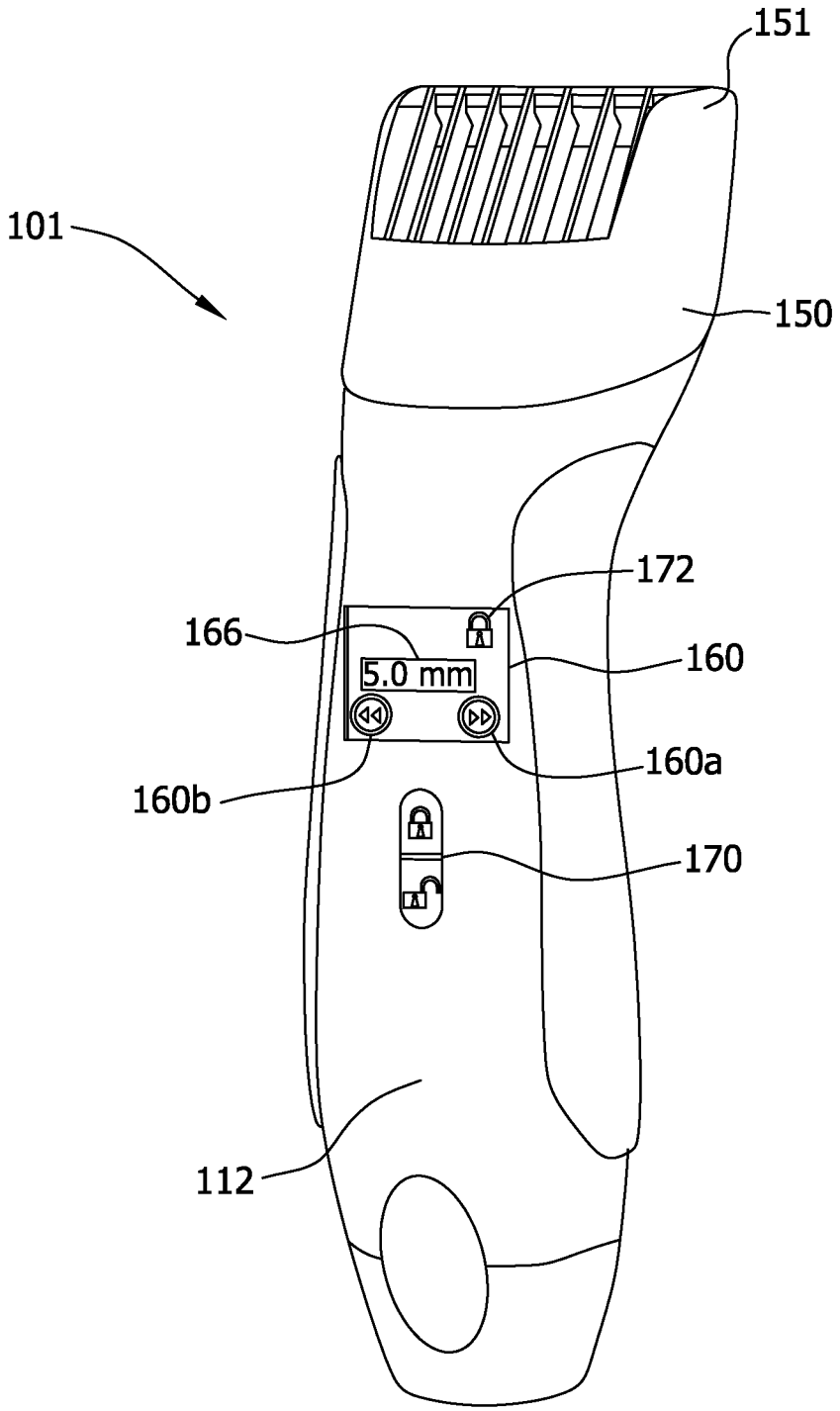
FIG. 1 is a perspective view of a first embodiment of an electric hair grooming appliance including a touchscreen.

Referring to the drawings, several embodiments of electric hair grooming appliances are provided. As explained in more detail below, each illustrated hair grooming appliance is configured to have at least one operation which facilitates grooming of hair. Each illustrated hair grooming appliance includes a touchscreen to allow a user to communicate with a control circuit of the hair grooming appliance. The touchscreen is configured to receive an input from a user and send a command signal to the control circuit. The control circuit is configured to control one or more operations of the hair grooming appliance in response to receiving the command signal.

Figure 2:
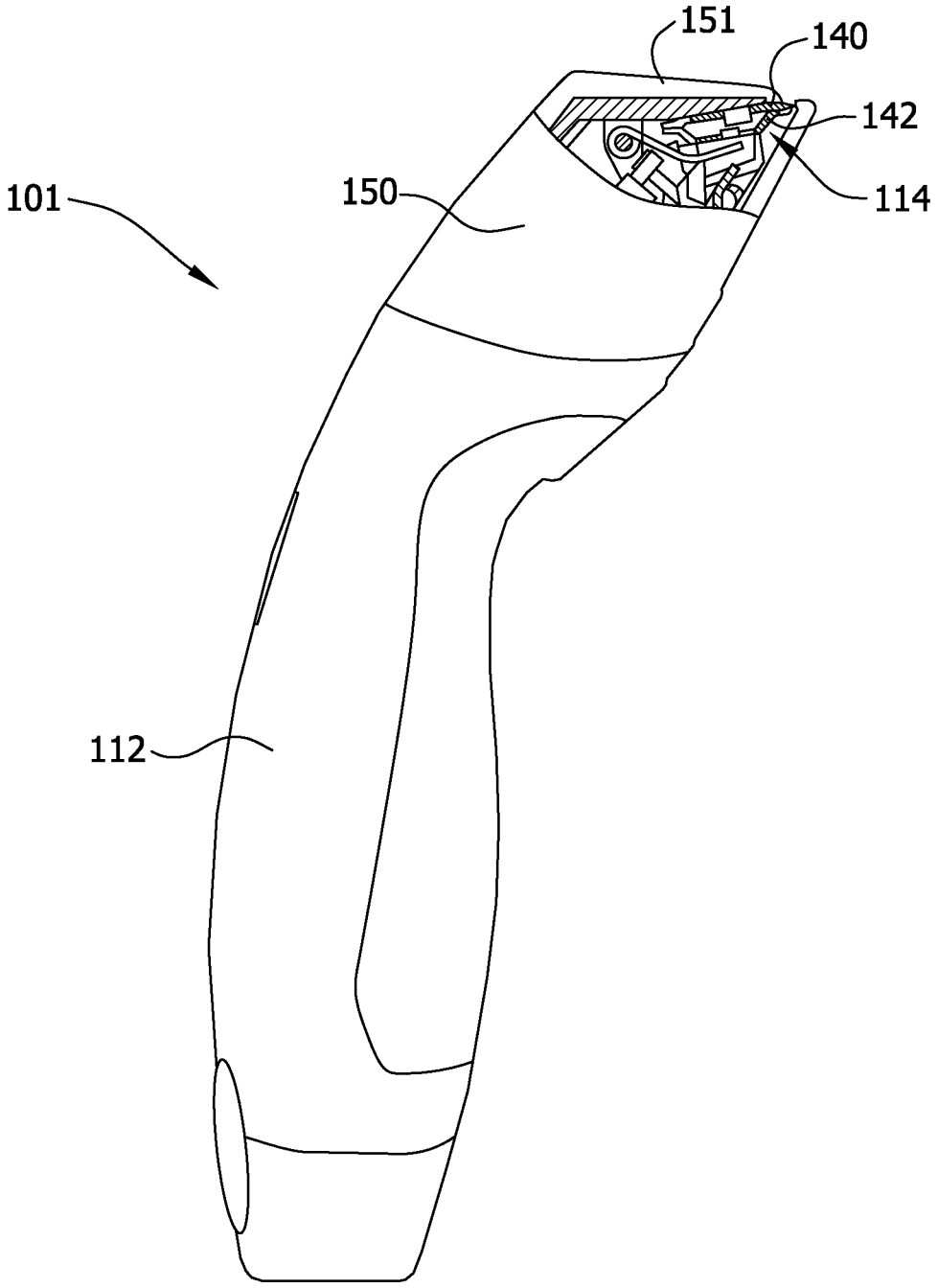
FIG. 2 is a right elevational view of the electric hair grooming appliance of FIG. 1.
Figure 3:
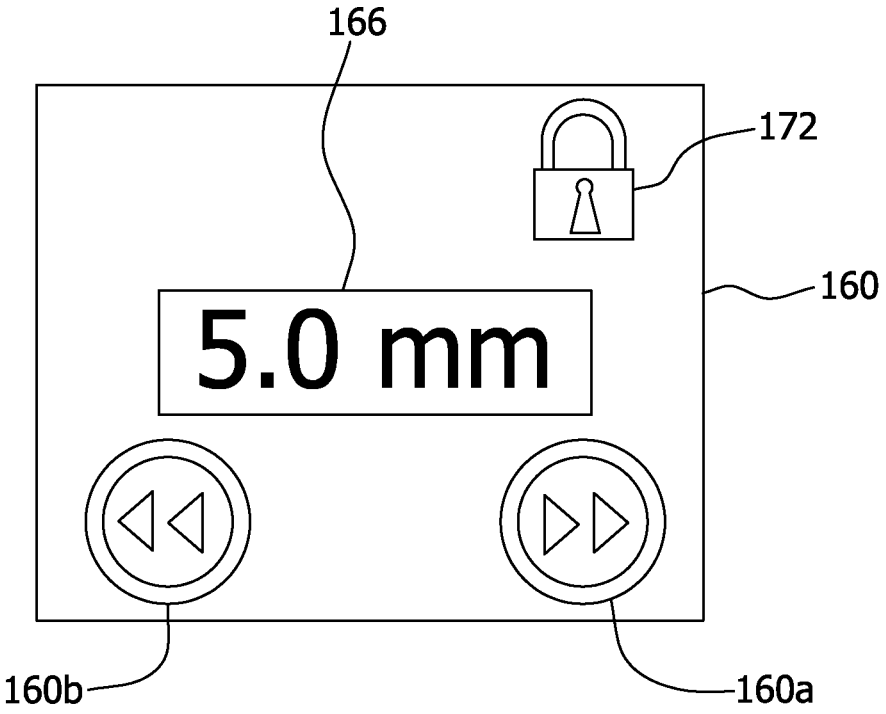
FIG. 3 is an enlarged front elevational view of the touchscreen of the electric hair grooming appliance of FIG. 1.

Referring first to FIGS. 1-3, in this illustrated embodiment the electric hair grooming appliance is generally in the form of a hair removing appliance, generally indicated at 101. More specifically, the illustrated hair removing appliance 101 is generally in the form of a hair trimmer including a housing 112, a blade head assembly (broadly, a hair-removing assembly), indicated generally at 114 (FIG. 2), and a drive assembly (not shown) for operating the blade head assembly. Together, the blade head assembly and drive assembly constitute a hair-removing device (broadly, a hair grooming device). The illustrated housing 112, or a portion thereof, is suitably sized and shaped as a handle so that it is easily held in a user's hand. The drive assembly generally comprises an electric drive motor (not shown) or other electric device. The drive motor may be powered by one or more batteries within the housing and/or by another suitable internal or external electrical power source. Referring to FIG. 2, the blade head assembly 114 generally comprises a stationary blade 140 and a reciprocating blade 142 (broadly, a hair-removing member). The drive assembly 116 is configured to drive reciprocating motion of the reciprocating blade 142 relative to the stationary blade 140. Such reciprocating motion of the reciprocating blade 142 cuts hair disposed between the blades. The trimmer 101 may be of other configurations without departing from the scope of the present invention.

The illustrated trimmer 101 also includes an adjustable comb assembly 150 (broadly, a hair grooming device), including a comb 151 that is selectively movable relative to the blade head assembly 114 through operation of a comb-driving assembly 154 (illustrated schematically in FIG. 4) within the housing. The comb assembly 150 allows a user to control a hair cut-length setting of the trimmer, which corresponds to the length of hair after being cut. The comb-driving assembly 154 may include an electric drive motor or other electrical device, and a transmission mechanism (not shown) coupling the motor to the comb to drive movement of the comb 151 to a plurality of different hair cut-length settings. The comb 151 may be selectively positionable to a discrete number of predetermined hair cut-length settings, or the comb assembly may be positionable to an infinite number of hair cut-length settings. It is understood that the trimmer 101 may not include a comb assembly without departing from the scope of the present invention. Moreover, the trimmer 101 may include other hair grooming devices, in addition to or in lieu of one or both of the illustrated hair grooming devices set forth above.

Figure 4:
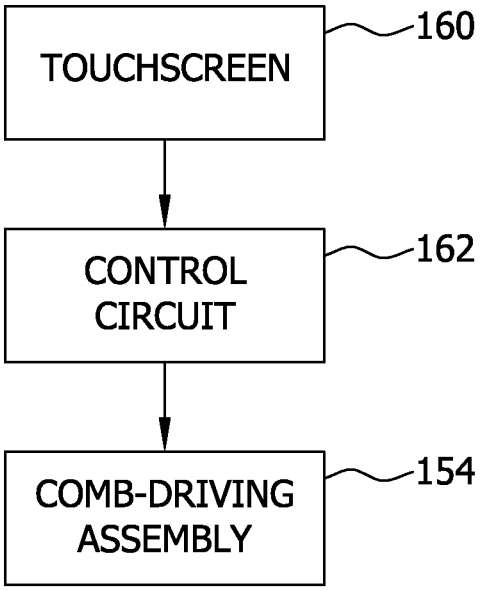
FIG. 4 is a block diagram of a first embodiment of a system of the electric hair grooming appliance of FIG. 1, including the touchscreen, a control circuit, and a comb-driving assembly.
Figure 11:
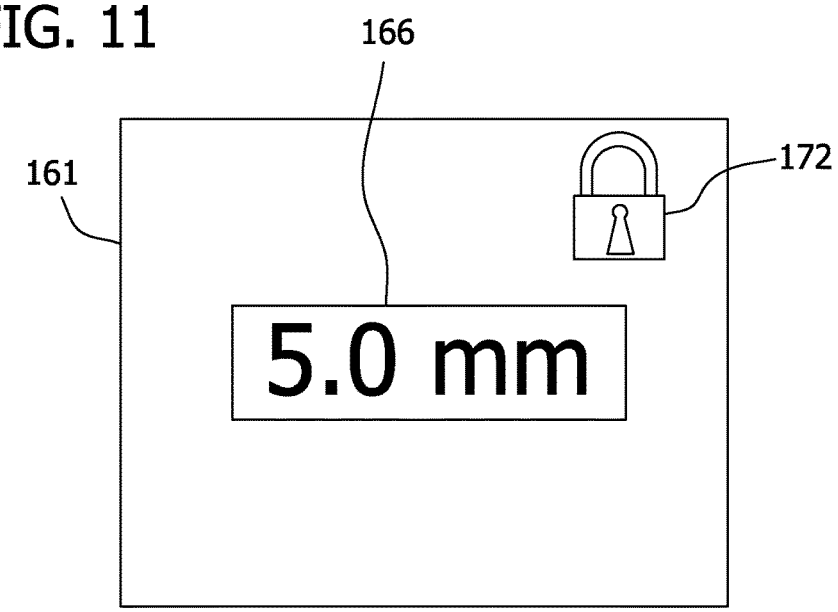
*FIG. 11 is an enlarged front elevational view of a screen displaying a graphical output of the electric hair grooming appliance of FIG. 1.*

Referring to FIGS. 1, 3 and 4 and as set forth above, the trimmer 101 includes a touchscreen, generally indicated at 160, to allow a user to control one or more operations of the trimmer. The touchscreen 160 is in electrical communication with a control circuit 162, which is disposed in the housing 112. The control circuit 162 may include a single controller (e.g., microcontroller), one or more controllers (e.g., microcontrollers), or one or more other electrical devices (e.g., processor, memory, and input/output peripherals) in communication with one another. In one embodiment, illustrated schematically in FIG. 4, the touchscreen 160 provides a user interface for a user to communicate with the control circuit 162 so that the user can select a desired hair cut-length setting of the trimmer 101. Thus, the touchscreen 160 is adapted to receive one or more inputs from the user. The touchscreen 160 may be any suitable type of touchscreen, including but not limited to a resistive touchscreen, a surface acoustic wave (SAW) touchscreen, a surface capacitance touchscreen, a projected capacitance touchscreen, an infrared touchscreen, an optical imaging touchscreen, a dispersive technology touchscreen, and an acoustic recognition touchscreen. The touchscreen 102, or another screen *161* (*FIG. 11*), may function as an output interface having a visual indicator indicative of the operation controlled by the touchscreen.

As seen in FIGS. 1 and 3, in the illustrated embodiment, the touchscreen 160 generates graphical inputs, such as icons in the form of right and left arrows 160a, 160b, respectively, to indicate the input locations on the touchscreen to respectively increase and decrease the cut-length setting. The icons 160a, 160b may be of other configurations and/or of other symbols without departing from the scope of the present invention. In response to a finger or other object (e.g., a stylus) touching the location on the touchscreen 160 corresponding to the right arrow icon 160a (i.e., in response to an input by the user), the touchscreen sends a first command signal to the control circuit 162. In response to receiving the command signal, the control circuit 162 sends an electrical first control signal to the comb-driving assembly 154. The comb-driving assembly 154, in turn, moves the comb 151 a predetermined amount relative to the blade head assembly 114 to increase the cut-length setting by a predetermined increment in response to receiving the electrical first control signal. In response to a finger or other object (e.g., a stylus) touching the location on the touchscreen 160 corresponding to the left arrow icon 160b (i.e., in response to an input by the user), the touchscreen sends a different, second command signal to the control circuit 162. In response to receiving the second command signal, the control circuit 162 sends a different, electrical second control signal to the comb-driving assembly 154. The comb-driving assembly 154, in turn, moves the comb 151 a predetermined amount relative to the blade head assembly 114 to decrease the cut-length setting by a predetermined increment in response to receiving the electrical second control signal. In an alternative embodiment, indicia including up and down arrow markings may be applied to the surface of the touchscreen instead of the touchscreen generating graphical icons.

The illustrated touchscreen 160 also generates graphical output 166 to communicate the selected hair-cut length setting to the user. In one example, the trimmer 101 may have hair cut-length settings ranging from about 0.2 mm to about 5.0 mm, in increments of about 0.2 mm. Thus, the graphical output 166 is able to output any numeral from 0.2 mm to 5.0 mm, in increments of 0.2 mm. The trimmer 101 may have other hair cut-length settings without departing from the scope of the present invention. Moreover, the output communicating the hair-cut length setting may be separate from the touchscreen 160 without departing from the scope of the present invention.

In the illustrated embodiment, the trimmer 101 also includes a locking control 170 (FIG. 1) for selectively locking the touchscreen 160 to prevent inadvertent adjustment of the hair cut-length setting, and to facilitate selective unlocking of the touchscreen to allow adjustment of the hair cut-length setting. In particular, the locking control 170 of the illustrated embodiment comprises one or more mechanical push buttons or other mechanical switches. The push button 170 has indicia indicating its functions of selectively locking and unlocking the touchscreen 160. The touchscreen 160 may generate one or more icons, such as locking icon 172 for indicating when the touchscreen is locked. In another example, the touchscreen 160 may generate one or more graphical icons to indicate the location(s) on the touchscreen to respectively lock and unlock the touchscreen. Other ways of providing a way of locking and unlocking the touchscreen 160 do not depart from the scope of the present invention.

Figure 5:
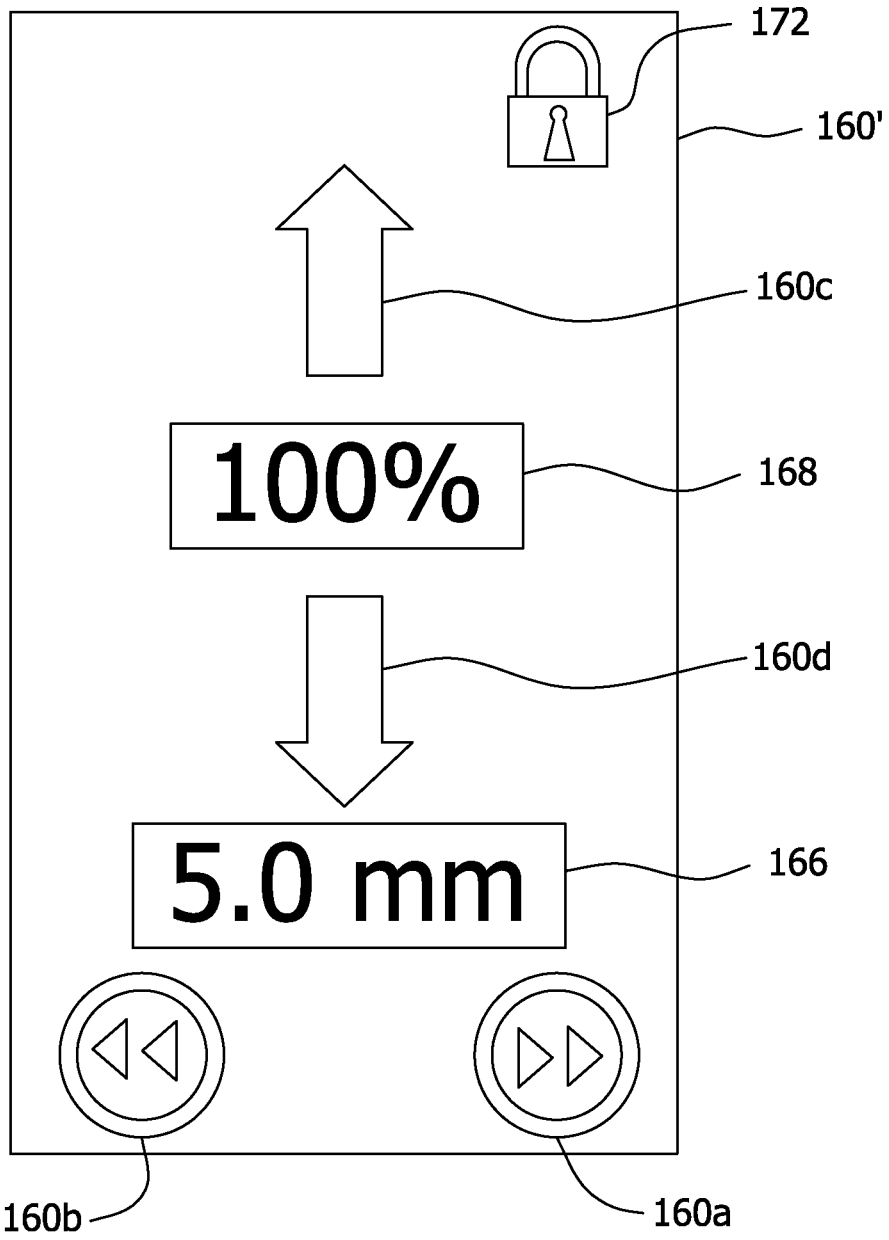
FIG. 5 is an enlarged front elevational view of a second embodiment of the touchscreen of the electric hair grooming appliance of FIG. 1.
Figure 6:
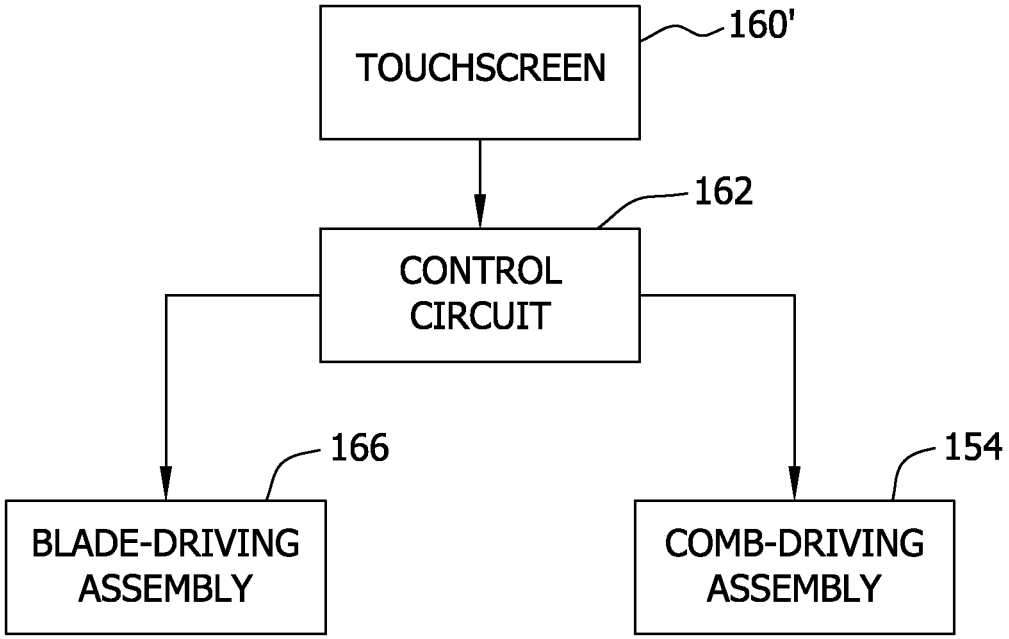
FIG. 6 is a block diagram of a second embodiment of a system of the electric hair grooming appliance of FIG. 1, including the touchscreen, the control circuit, the comb-driving assembly, and a blade-driving assembly.

The touchscreen 160 may also be configured to facilitate control of other operations of the trimmer 101 in addition to or in lieu of controlling the movement and positioning of the comb 151 relative to the blade head assembly 114. For example, FIG. 5 depicts an exemplary second embodiment of a touchscreen 160' for use on a trimmer. This touchscreen 160' allows the user to adjust a speed-setting of the reciprocating blade 142, as well as control the hair cut-length setting, such at set forth above. In such an example, the touchscreen 160' may generate graphical inputs, such as icons in the form of up and down arrows 160b, 160c, respectively, or other symbols, in addition to the left and right arrows for controlling the hair cut-length setting. In response to the user touching the respective locations on the touchscreen 160' corresponding to the respective up and down arrow icons, 160c, 160d, the touchscreen sends respective third and fourth command signals to the control circuit 162. The control circuit 162, in response to receiving the respective third and fourth command signals, sends respective third and fourth control signals to the drive assembly, illustrated schematically at 166 in FIG. 6, to respectively increase and decrease the speed of the reciprocating blade 142 by a selected increment to a selected speed-setting. The selected speed-setting may be communicated to the user as a graphical output 168, which may represent a percentage of the full speed of the reciprocating blade. Other ways of communicating the selected speed-setting to the user do not depart from the scope of the present invention.

Within the scope of the present invention are other types of hair removing appliances including a touchscreen, which may be similar or identical to the touchscreen 160 and/or 160' set forth above, to allow a user to communicate with a control circuit of the hair removing appliance. As non-limiting examples, other types of hair removing appliances within the scope of the present invention include foil shavers, rotary shavers, hair clippers, and epilators. Within the scope of the present invention, each of these hair removing appliances includes the touchscreen (e.g., touchscreen 160 or 160') in communication with a control circuit; a drive assembly including, for example, an electric motor, which is driven by electric energy such as from a battery source or another source of electrical energy; and a movable hair-removing member (e.g., a rotary blade in the rotary shaver, an oscillating blade in the hair clipper, and pinching plates and/or tweezing members in the epilator) operatively coupled to the electric motor and configured for removing hair. Each of these exemplary hair removing appliances may include other hair grooming devices in addition to the hair grooming device comprising the hair-removing member and the drive assembly. In each of these additional exemplary hair removing appliances, the control circuit is configured to receive a command signal from the touchscreen in response to an input, and in response to receiving the command signal, the control circuit controls an operation of at least one of the hair grooming devices of the hair removing appliance by sending a control signal to the hair grooming device For example, in each of the exemplary hair removing appliances described herein, the control circuit may be configured to control the speed of the corresponding movable hair-removing member.

Figure 7:
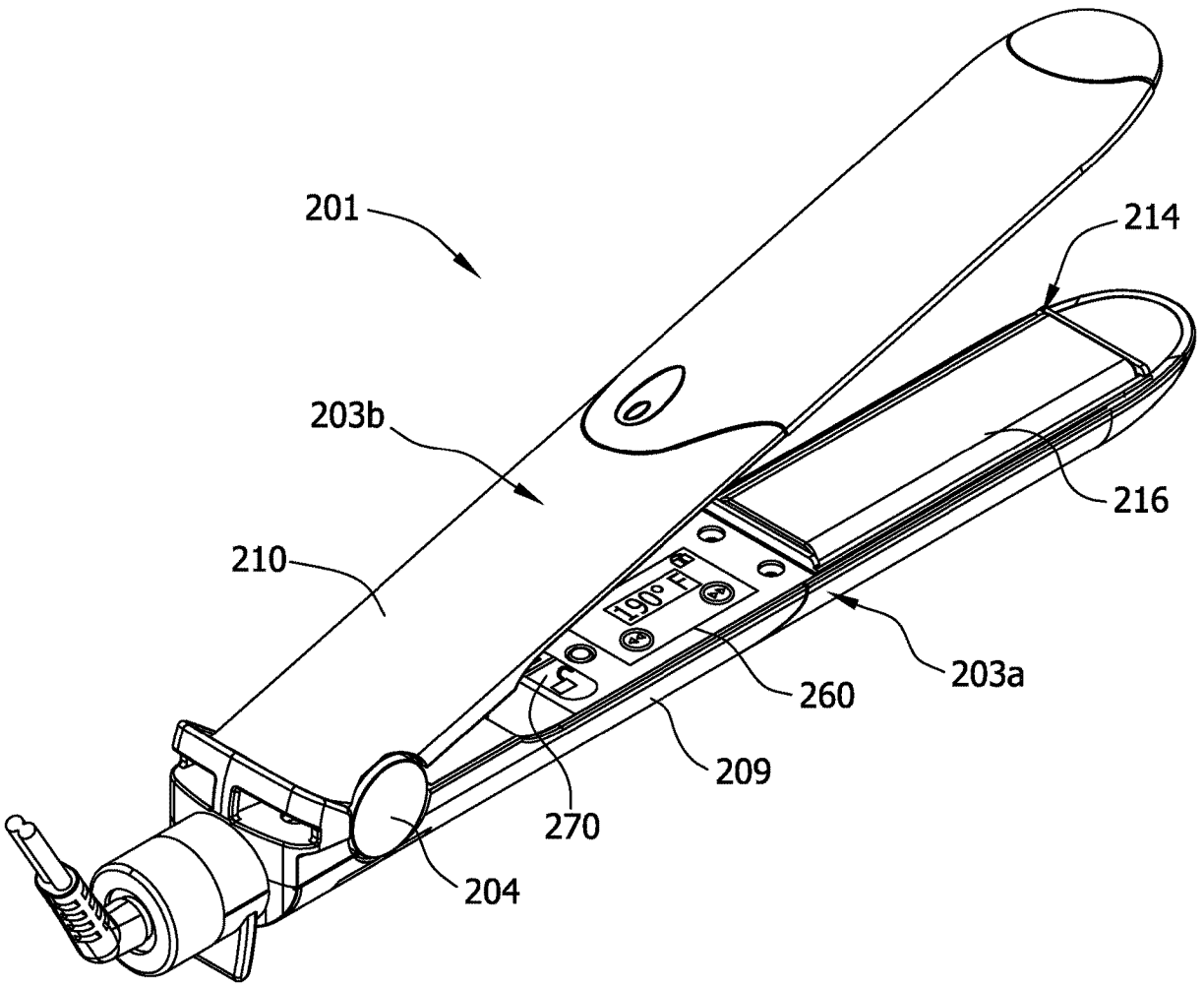
FIG. 7 is a perspective view of a second embodiment of an electric hair grooming appliance including a touchscreen.

Referring now to FIGS. 7-10 a second embodiment of an electric hair grooming appliance including a touchscreen is generally indicated at 201 (FIG. 7). In general, this embodiment 201 is adapted to apply heat to hair, as explained in more detail below, and more specifically, the illustrated hair styling apparatus is in the form of a flat iron. The illustrated flat iron 201 is generally elongate with opposite longitudinal ends and has first and second arms, generally indicated at 203a and 203b, respectively, held in assembly with each other by a suitable pivot connection 204 at one of the longitudinal ends of the flat iron. The first and second arms 203a, 203b are thus moveable relative to one another and about a pivot axis of the pivot connection 204 between an open position (FIG. 7) of the flat iron 201 and a closed position (not illustrated) thereof. A biasing member in the form of a compression spring (not shown) is suitably positioned between the first and second arms 203a, 203b adjacent to the pivot connection 204 to urge the arms toward the open position of the flat iron 201.

Figure 8:
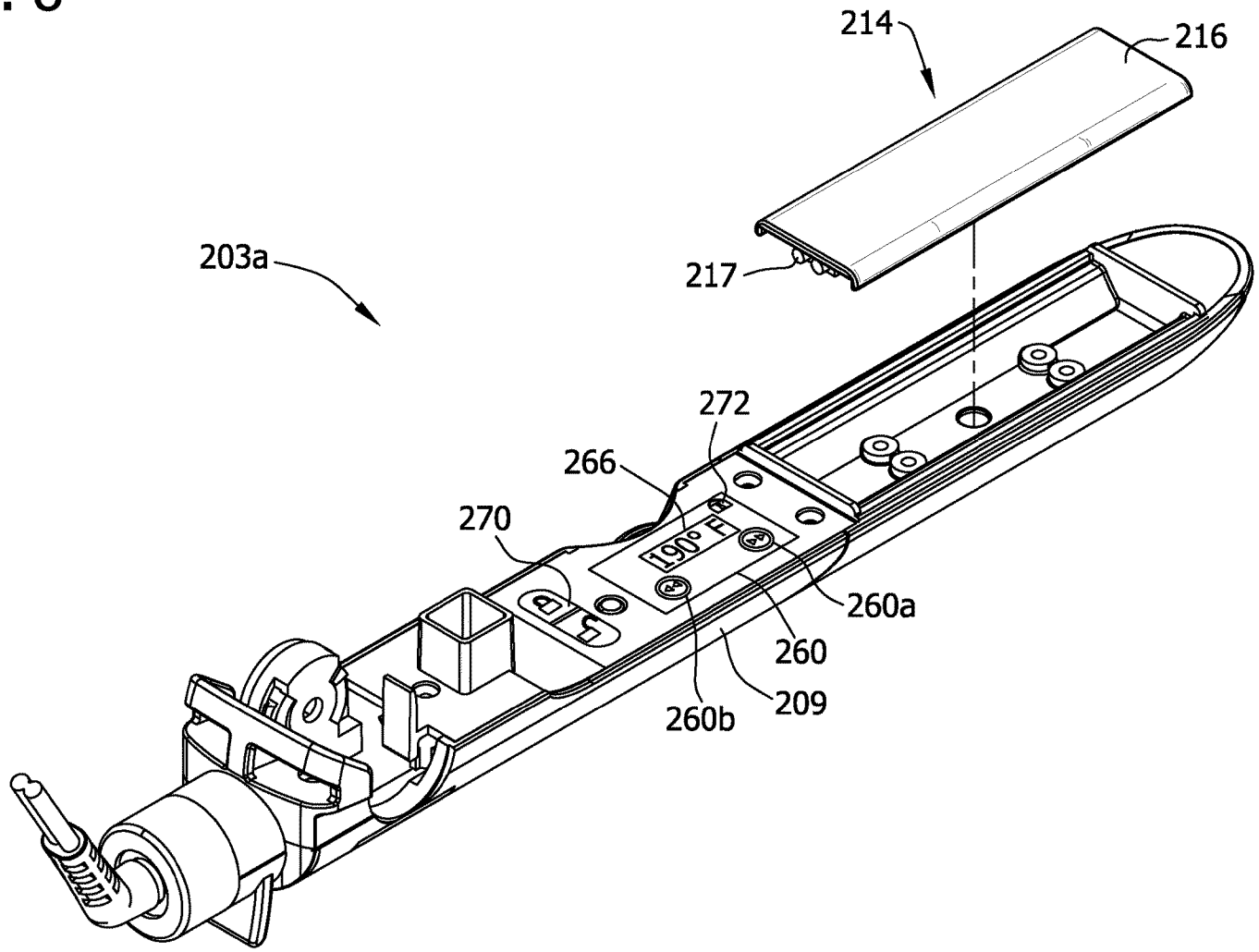
FIG. 8 is an enlarged, perspective view of a lower arm of the electric hair grooming appliance of FIG. 7, with a heating member assembly exploded therefrom.
Figure 9:
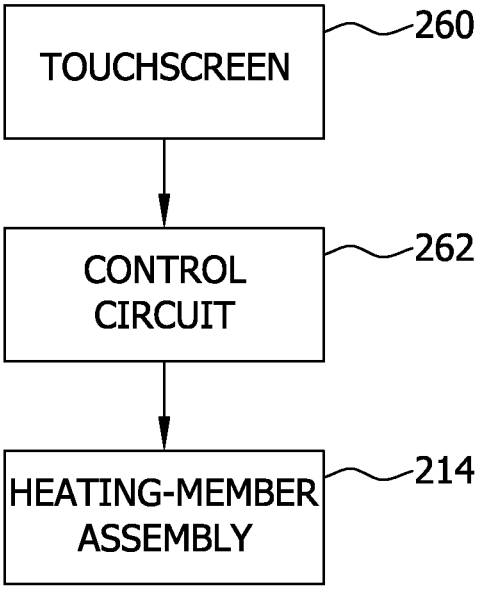
FIG. 9 is a block diagram of a first embodiment of a system of the electric hair grooming appliance of FIG. 7, including the touchscreen, a control circuit, and a heating member assembly.
Figure 10:
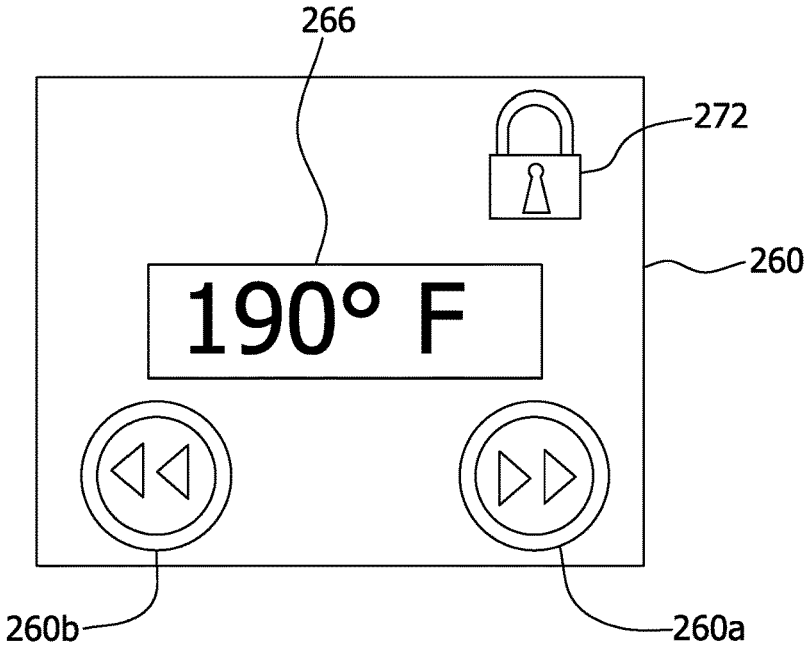
FIG. 10 is an enlarged front elevational view of the touchscreen of the electric hair grooming appliance of FIG. 7.

Each of the first and second arms 203a, 203b comprises an outer shell or housing member 209, 210, respectively, and a heating member assembly secured thereto (only heating member assembly 214 associated with the first arm is illustrated). The heating member assemblies 214 of the first and second arms 203a, 203b may be substantially identical, and for ease of description only, the heating member assembly of the first arm only is described herein, with the understanding that the description of the heating member assembly of the first arm may apply equally to the heating member assembly of the second arm. Referring to FIG. 8, the heating member assembly 214 comprises a thermally conductive heating member 216, which may be constructed of any suitable material, such as, without limitation, metal, ceramic materials or combinations thereof; a heating unit 217 disposed within the housing member 209; and a temperature sensing unit (not shown), which may include a thermistor and heat conductor in thermal contact with the heating unit (or heating member) and the thermistor.

The heating unit 217 suitably comprises one or more heaters, such as electrical resistance heaters (e.g., PTC heating units), positioned in contact with or in sufficiently close proximity to the heating member 216 to heat the heating member during use of the flat iron 201. For example, in one suitable embodiment the heating unit 217 is operable to heat the heating member 216 to a styling temperature of at least about 100 degrees Celsius, and may heat the heating member up to a temperature of about 250 degrees Celsius. In another embodiment the heating unit 217 is operable to heat the heating member 216 to a styling temperature in the range of about 180 to about 230 degrees Celsius. It is understood that other suitable heating units or heating methods may be used to heat the heating member 216 without departing from the scope of this invention.

The heating members 216 of the respective heating member assemblies 214 of the first and second arms 203a, 203b are sufficiently located longitudinally on the respective arms so that in the closed position of the flat iron 201 the heating members 214 sandwich and compress hair therebetween. In the open position of the flat iron 201, the heating members 216 are spaced apart from one another a sufficient distance to allow the introduction of hair between the heating members.

As set forth above and seen throughout FIGS. 7-10, the flat iron 201 includes a touchscreen, generally indicated at 260, to allow a user to control one or more operations of the flat iron. The touchscreen 260 is in electrical communication with a control circuit 262, which is disposed in one of the housing members 209, 210. In one embodiment, illustrated schematically in FIG. 9, the touchscreen 260 provides a user interface for a user to communicate with the control circuit 262 so that the user can select a desired temperature setting of the flat iron 201, more specifically, a temperature setting of the heating member assemblies 214. Thus, the touchscreen 260 is adapted to receive one or more inputs from the user. The touchscreen 260 may be any suitable type of touchscreen, including but not limited to a resistive touchscreen, a surface acoustic wave (SAW) touchscreen, a surface capacitance touchscreen, a projected capacitance touchscreen, an infrared touchscreen, an optical imaging touchscreen, a dispersive technology touchscreen, and an acoustic recognition touchscreen. The touchscreen 260, or another screen, may function as an output interface to communicate to the user the selected temperature setting.

In one embodiment, the touchscreen 260 generates graphical inputs, such as icons in the form of right and left arrows 260a, 260b, respectively (FIGS. 8 and 10), to indicate the locations on the touchscreen to respectively increase and decrease the temperature setting. The icons 260a, 260b may be of other configurations and/or of other symbols without departing from the scope of the present invention. In response to a finger or other object (e.g., a stylus) touching the location on the touchscreen 260 corresponding to the right arrow icon 260a (i.e., in response to an input by the user), the touchscreen sends a first command signal to the control circuit 262. In response to receiving the first command signal, the control circuit 262 sends an electrical first control signal to the heating member assemblies 214 (e.g., to the PTC heating units 217), which increases the heat output of the heating units 217 to increase the temperatures of the heating members 216 by a predetermined increment. Moreover, in response to a finger or other object (e.g., a stylus) touching the location on the touchscreen 260 corresponding to the left arrow icon 260b (i.e., in response to an input by the user), the touchscreen sends a different second command signal to the control circuit 262. In response to receiving the second command signal, the control circuit 262 sends a different, second electrical control signal to the heating member assemblies 214, which decreases the heat output of the heating units 217 to decrease the temperatures of the heating members 216 by a predetermined increment. In an alternative embodiment, indicia, including right and left arrow markings, may be applied to a surface of the touchscreen instead of the touchscreen generating the icons.

The illustrated touchscreen 260 also generates graphical output 266 to communicate the selected temperature setting, or other selected operation, to the user. It is understood, however, that the output communicating the temperature setting to the user may be separate from the touchscreen 260, such as on a separate display screen, without departing from the scope of the present invention.

The touchscreen 260 may also be configured to facilitate control of other operations of the flat iron 201 in addition to or in lieu of controlling the temperatures of the heating members 216.

In the illustrated embodiment, the flat iron 201 also includes a locking control 270 for selectively locking the touchscreen 260 to prevent inadvertent adjustment of the temperature setting, and to facilitate selective unlocking of the touchscreen to allow adjustment of the temperature setting. In particular, the locking control 270 of the illustrated embodiment comprises one or more push buttons or other mechanical switches. The push button 270 has indicia indicating its functions of selectively locking and unlocking the touchscreen 260. The touchscreen 260 may generate one or more icons, such as icon 272, for indicating when the touchscreen is locked and/or unlocked. In another example, the touchscreen 260 may generate one or more icons to indicate the location(s) on the touchscreen to respectively lock and unlock the touchscreen. Other ways of providing a way of locking and unlocking the touchscreen 260 do not depart from the scope of the present invention.

Within the scope of the present invention are other types of hair styling appliances for applying heat to hair and including a touchscreen, such as the touchscreen 260 set forth above, to allow a user to communicate with a control circuit of the hair styling appliance. As non-limiting examples, other types of hair styling appliances within the scope of the present invention include curling irons, blow dryers, and hair setters (also known as hot rollers). Within the scope of the present invention, each of these hair styling appliances includes the touchscreen in communication with a control circuit; and a heating member assembly, which is heated by electric energy such as from a battery source or another source of electrical energy. In each of these exemplary hair removing appliances, the control circuit is configured to receive a command signal from the touchscreen in response to an input, and in response to receiving the command signal, the control circuit controls an operation of the hair removing appliance. For example, in each of the exemplary hair removing appliances set forth, the control circuit may be configured to control the temperature of the heating member assembly. With respect to an exemplary blow dryer, the touchscreen may allow the user to control the speed of the fan, in addition to the temperature of the air.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An electric, handheld hair grooming appliance comprising:

a housing;

at least one hair grooming device adapted to facilitate grooming hair, said at least one hair grooming device comprising a movable comb;

a comb-driving assembly operatively coupled to the comb for moving the comb to a selected hair cut-length setting of the hair grooming appliance;

a control circuit in the housing for operating said at least one hair grooming device; [and]

a touchscreen on at least one of the at least one hair grooming device and the housing for receiving at least one input from a user to facilitate communication between the user and the control circuit, the touchscreen being configured to send at least one command signal to the control circuit in response to receiving said at least one input from the user*; and*

*a locking control for selectively locking the touchscreen*, wherein the control circuit is configured to control said movement of the at least one hair grooming device in response to receiving said at least one command signal such that the user is able to operate the at least one hair grooming device using the touchscreen, and wherein the touchscreen is configured to receive a first input of said at least one input from the user and send a first command signal of said at least one command signal to the control circuit in response to receiving said first input, and wherein the touchscreen is configured to receive a second input of said at least one input from the user and send a second command signal of said at least one command signal to the control circuit in response to receiving said second input, the control circuit being configured to control the comb-driving assembly to move the comb to increase the cut-length setting of the hair grooming appliance in response to receiving said first command signal, and configured to control the comb-driving assembly to move the comb to decrease the hair cut-length setting of the hair grooming appliance in response to receiving said second command signal.

2. An electric hair grooming appliance as set forth in claim 1 wherein the touchscreen is configured to generate a first icon for indicating a first location on the touchscreen for receiving the first input, and to generate a second icon for indicating a second location on the touchscreen for receiving the second input.

3. An electric hair grooming appliance as set forth in claim 1 further comprising indicia applied to the touchscreen, the indicia including a first marking for indicating a first location on the touchscreen for receiving the first input, and a second marking for indicating a second location on the touchscreen for receiving the second input.

4. An electric hair grooming appliance as set forth in claim 1 further comprising*:*

*a reciprocating blade; and* an electric motor for moving [the at least one hair grooming device] *said reciprocating blade* at a selected speed-setting.

[5. An electric hair grooming appliance as set forth in claim 1 wherein the hair grooming appliance comprises a locking control for selectively locking the touchscreen.]

6. An electric, handheld hair grooming appliance comprising:

a housing;

at least one hair grooming device adapted to facilitate grooming hair, said at least one hair grooming device comprising one of a movable hair cutting blade and a movable hair pinching plate;

a drive assembly operatively coupled to one of the hair cutting blade and the hair pinching plate;

a control circuit in the housing for operating said at least one hair grooming device; and a touchscreen on at least one of the at least one hair grooming device and the housing for receiving at least one input from a user to facilitate communication between the user and the control circuit, the touchscreen being configured to send at least one command signal to the control circuit in response to receiving said at least one input from the user, wherein the control circuit is configured to control said movement of the at least one hair grooming device in response to receiving said at least one command signal such that the user is able to operate the at least one hair grooming device using the touchscreen, and wherein the touchscreen is configured to receive a first input of said at least one input from the user and send a first command signal of said at least one command signal to the control circuit in response to receiving said first input, and wherein the touchscreen is configured to receive a second input of said at least one input from the user and send a second command signal of said at least one command signal to the control circuit in response to receiving said second input, the control circuit being configured to control the drive assembly to decrease the speed of the one of the blade and the plate in response to receiving said first command signal, and adapted to control the drive assembly to increase the speed of the one of the blade and the plate in response to receiving said second command signal.

7. An electric hair grooming appliance as set forth in claim 6 wherein the touchscreen has a first icon for indicating a first location on the touchscreen for receiving the first input, and a second icon for indicating a second location on the touchscreen for receiving the second input.

*8. An electric, handheld hair grooming appliance comprising:*

*a housing;*

*at least one hair grooming device adapted to facilitate grooming hair, said at least one hair grooming device comprising a movable comb;*

*a comb-driving assembly operatively coupled to the comb for moving the comb to a selected hair cut-length setting of the hair grooming appliance;*

*a control circuit in the housing for operating said at least one hair grooming device; and*

*a touchscreen on at least one of the at least one hair grooming device and the housing for receiving at least one input from a user to facilitate communication between the user and the control circuit, the touchscreen being configured to send at least one command signal to the control circuit in response to receiving said at least one input from the user,*

*wherein the control circuit is configured to control said movement of the at least one hair grooming device in response to receiving said at least one command signal such that the user is able to operate the at least one hair grooming device using the touchscreen,*

*wherein the touchscreen is configured to receive a first input of said at least one input from the user and send a first command signal of said at least one command signal to the control circuit in response to receiving said first input, and wherein the touchscreen is configured to receive a second input of said at least one input from the user and send a second command signal of said at least one command signal to the control circuit in response to receiving said second input, the control circuit being configured to control the comb-driving assembly to move the comb to increase the cut-length setting of the hair grooming appliance in response to receiving said first command signal, and configured to control the comb-driving assembly to move the comb to decrease the hair cut-length setting of the hair grooming appliance in response to receiving said second command signal, and*

*wherein the hair grooming appliance further comprises a mechanical locking control for selectively locking the touchscreen to prevent inadvertent adjustment of the cut-length setting.*

*9. An electric hair grooming appliance as set forth in claim 8 wherein the mechanical locking control is a push button.*

*10. An electric hair grooming appliance as set forth in claim 9 wherein the push button and the touchscreen are mounted on the same side of the housing.*

*11. An electric hair grooming appliance as set forth in claim 10 wherein the push button is situated below the touchscreen.*

*12. An electric hair grooming appliance as set forth in claim 11 wherein the appliance generates a graphical output to communicate the cut-length setting to a user, the graphical output being located on the same side of the housing as the touchscreen and the push button.*

*13. An electric hair grooming appliance as set forth in claim 12 wherein the touchscreen generates a graphical icon denoting an area of the touchscreen which is touchable for adjusting the cut-length setting.*

*14. An electric hair grooming appliance as set forth in claim 13 wherein the graphical icon is a plurality of spaced-apart graphical icons.*

*15. An electric hair grooming appliance as set forth in claim 14 wherein the graphical icons are arrow-shaped.*

*16. An electric hair grooming appliance as set forth in claim 14 wherein the graphical output is generated on the touchscreen.*

*17. An electric hair grooming appliance as set forth in claim 14 wherein the graphical output is not generated on the touchscreen.*

*18. An electric hair grooming appliance as set forth in claim 17 wherein the graphical output is a numerical output.*

*19. An electric hair grooming appliance as set forth in claim 18 wherein the numerical output is presented in units of tenths of millimeters.*

*20. An electric hair grooming appliance as set forth in claim 14 wherein appliance generates a locking icon indicating that the touchscreen is locked.*

* * * * *